US006415655B2

(12) United States Patent
Loof et al.

(10) Patent No.: US 6,415,655 B2
(45) **Date of Patent: *Jul. 9, 2002**

(54) METHOD OF SYNCHRONIZATION OF MULTI-CYLINDER INTERNAL COMBUSTION ENGINE

(75) Inventors: Holger Loof, Ditzingen; Thilo Jahn, Ludwigsburg; Martin Widmer, Moeglingen, all of (DE)

(73) Assignee: Robert Bosch GmbH, Stuttgart (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,988

(22) Filed: Feb. 24, 1999

(30) Foreign Application Priority Data

Mar. 10, 1998 (DE) ........................................ 198 10 214

(51) Int. Cl.[7] .............................................. G01M 15/00
(52) U.S. Cl. .................................................... 73/117.3
(58) Field of Search ............................... 73/116, 117.2, 73/117.3, 118.1

(56) References Cited

U.S. PATENT DOCUMENTS 5,311,771 A * 5/1994 Young ....................... 73/117.3
5,604,304 A * 2/1997 Kokubo et al. ............ 73/117.3
5,970,784 A * 10/1999 Genin ....................... 73/117.3

FOREIGN PATENT DOCUMENTS

DE 40 40 828 12/1990

* cited by examiner

*Primary Examiner*—Eric S. McCall
(74) *Attorney, Agent, or Firm*—Michael J. Striker

(57) ABSTRACT

A method of synchronization or a cylinder coordination to a crankshaft position in a multi-cylinder internal combustion engine with a crankshaft which rotates twice per working cycle, comprising the steps of supplying an output signal with a crankshaft transmitter, which per revolution of the crankshaft supplies a reference signal associated with an upper dead point of a cylinder, evaluating the output signal of the crankshaft transmitter by a control device for determining a rotary speed of the crankshaft and for forming injection signals, performing a preliminary synchronization after a detection of the reference signal and releasing a probe injection for an associated cylinder, verifying the preliminary synchronization in the case of a rotary speed increase or a rotary speed acceleration, in the event of a failing rotary speed increase, performing a new preliminary synchronization which is offset by a predetermined angle to release an injection for a cylinder presumably in an upper dead point, and verifying this preliminary synchronization during a rotary speed increase.

6 Claims, 3 Drawing Sheets

°KW
U1
U2
U3
n
R1
R2
R3
R4
R5
SI
720°KW
Δn

METHOD OF SYNCHRONIZATION OF MULTI-CYLINDER INTERNAL COMBUSTION ENGINE

BACKGROUND OF THE INVENTION

The present invention relates to a method of synchronization or cylinder coordination to crankshaft position in a multi-cylinder internal combustion engine.

In a multi-cylinder internal combustion engine with a crankshaft and a cam shaft, in which a control device calculates when and how much fuel must be injected per cylinder, it must be guaranteed that the fuel is supplied to the individual cylinders at proper time points and in a proper quantity. In order to perform the computations in a correct way, the corresponding position of the cam shaft or the crankshaft of the internal combustion engine must be known, and it is therefore conventional to provide a crankshaft and a camshaft transmitter which determines the position. For this purpose the crankshaft and the camshaft is connected each with a disk which has a predetermined number of angular marks. The disk connected with the crankshaft has for example n-e (for example 60-2) angular marks, which also form the reference marks by a gap between two angular marks. The disk connected with the cam shaft also has an angular mark. Both transmitter disks are scanned by a suitable pickup which provides an output signal corresponding to the surface of the disk.

Since in a four-stroke internal combustion engine, two crankshaft revolutions are required for a working cycle, in the normal situation the cylinder coordination to the crankshaft signal is performed by means of the signal from the camshaft transmitter. When the camshaft transmitter is not available, a redundant synchronization or in other words a cylinder coordination to the crankshaft signal can be performed exclusively from the crankshaft signal. Since the crankshaft signal supplies the reference marks in each revolution, no complete cylinder coordination to the crankshaft angle is possible.

For performing such a coordination, a control system for an internal combustion engine regulation is proposed in the German document DE-os40 40 828. Here with the known reference marks in the crankshaft signal from the control device of the internal combustion engine, an injection is performed in one or for one cylinder of the internal combustion engine, from which it is assumed that during occurrence of the reference mark it is located in an upper dead point. Since in the control device moreover the rotary speed of the internal combustion engine is continuously determined by evaluation of a predeterminable signal length of the crankshaft signals, it can be determined whether a rotary speed increase is caused by the probe measurement. The rotary speed increase as a result performs the probe injection only when the injected fuel is ignited. By the ignition or the combustion process, a rotary speed acceleration is caused, whereby the control device determines that the cylinder in which the injection was performed is located in the upper dead point. Thereby no synchronization, or in other words the cylinder coordination to the crankshaft signal is performed.

Since the position of all cylinders relative to the crankshaft cylinder is known, it is proposed in the German reference DE-OS 4,040,828 to use a control system for an internal combustion engine, in which in the case when the injection does not lead to a rotary speed increase or a rotary speed acceleration, the injection must be performed in a false cylinder. Then a synchronization is performed, and the synchronization in this case is displaced simply by 360° KW.

SUMMARY OF THE INVENTION

Accordingly, it is an object of the present invention to provide a method of synchronization of a multi-cylinder internal combustion engine which avoids the disadvantages of the prior art.

More particularly, it is an object of the present invention to provide a method of synchronization of a multi-cylinder internal combustion engine which, when compared with the known solutions is more reliable and prevents a false synchronization with a great safety.

In keeping with these objects and with others which will become apparent hereinafter, one feature of present invention resides, briefly stated, in a method of synchronization of a multi-cylinder internal combustion engine, in which after the recognition of the reference mark of the crankshaft signal, first a first probe injection is formed in one or for one cylinder which is presumably located in an upper dead point.

If after the probe injection, a rotary speed increase or a rotary speed acceleration is obtained, the synchronization is performed or in other words the cylinder coordination to the crankshaft signal. If no rotary speed increase or no rotary speed acceleration is performed, a further preliminary acceleration is displaced by 360°. Then a further probe injection for a cylinder is performed, which is presumably in an upper dead point. It is then again checked whether a rotary speed increase is obtained. If this is the case, the final synchronization is performed. If no rotary speed increase is recognized, it is assumed that no combustion is performed, and the method is repeated until the synchronization is found or a predeterminable permitted number of probe injections is obtained.

The inventive method guarantees that in the case in which an injection at a proper time point or at a proper crankshaft angle does not lead to an ignition or a combustion, no fault synchronization is released. Thereby the inventive method also at low temperatures at which a correct injection does not lead to ignition can be utilized. The probe injections can be released in a preferable manner not always for the same cylinder in order to prevent an excessive loading. Moreover, in an advantageous manner it is prevented that an excessive fuel quantity is supplied to a cylinder. The sequence of the probe injections must not start preferably with the same cylinder. It is advantageous when the redundant synchronization step starts at each new start with a new cylinder, and it has to be taken into consideration that in many cylinders the ignition capacity relative to other cylinders is reduced.

The inventive method can be used in an especially advantageous manner in an internal combustion engine with a crankshaft and a camshaft transmitter, when the camshaft transmitter failed with. With this method the cam shaft transmitter is completely removed, and the synchronization is performed basically by the utilization of the crankshaft signals and the results of the probe measurements.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
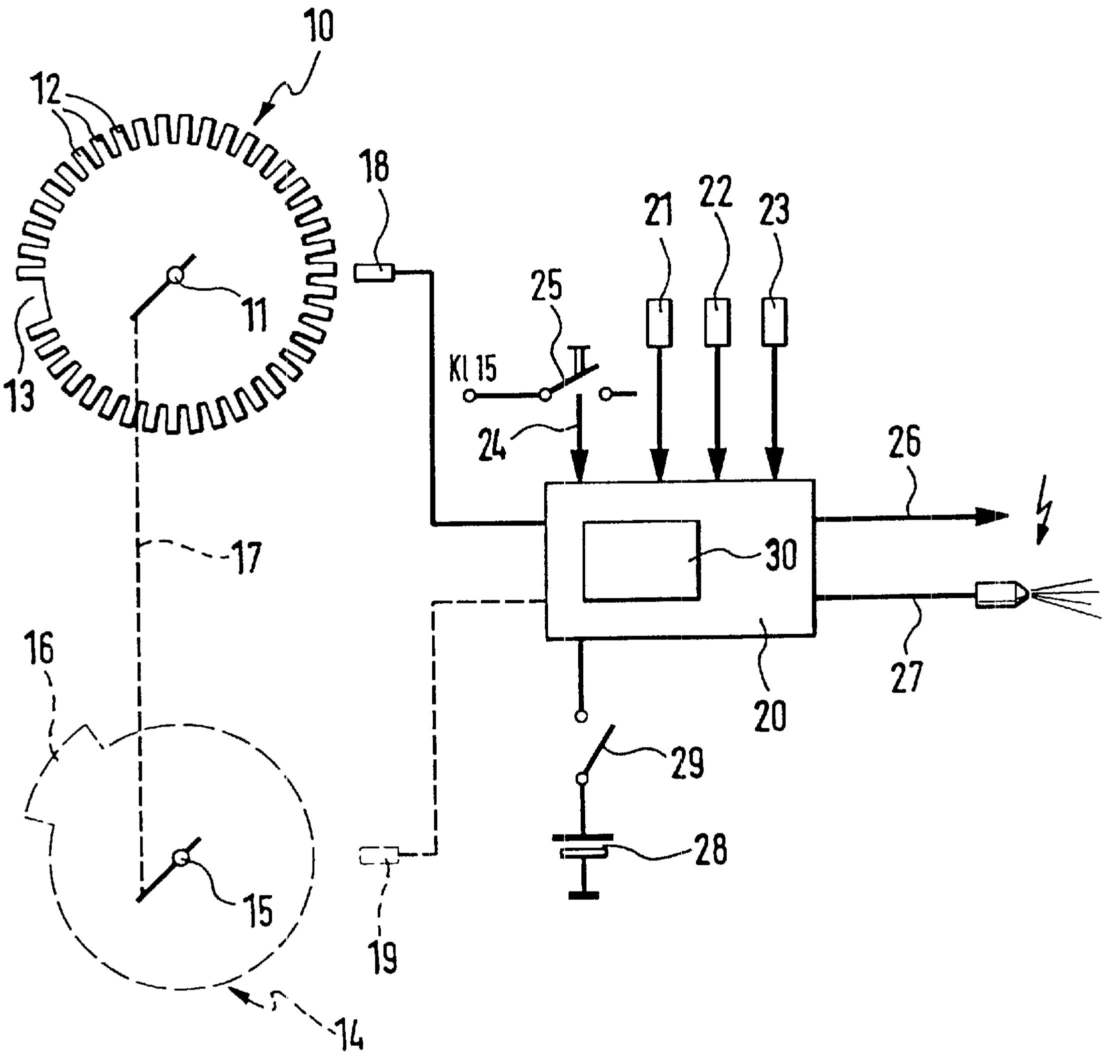
FIG. 1 is a view showing an arrangement for crankshaft and camshaft together with associated sensors and a control device, in which computations required for regulation of the internal combustion engine are performed.

FIG. 1 schematically shows components of an internal combustion engine which are necessary for understanding of the invention in an exemplary way. A transmitter disk 10 is fixedly connected with a crankshaft 11 of the internal combustion engine and is provided on its periphery with a plurality of identical angular marks 12. In addition to the identical angular marks 12 also a reference mark 13 is provided. It can be formed for example by two absent angular marks. The number of the identical angular marks 12 amounts to for example 58 (60-2).

A second transmitter disk 14 is connected with a cam shaft 15 of the internal combustion engine and has on its periphery at least one angular mark 16 for determination of a phase position of the internal combustion engine. A connection between the crankshaft 11 and the camshaft 15 is symbolically identified with reference numeral 17. The crankshaft rotates with a double speed of the camshaft as well known. A working cycle of the internal combustion engine therefore extends over one camshaft revolution or two crankshaft revolutions.

The shown design of the transmitter disks 10, 14 connected with the crankshaft 11 and the camshaft 15 are only exemplary and can be replaced by other designs. In particular the number of the angular marks 16 of the transmitter disk 16 of the transmitter disk 14 or the number of the reference mark 13 can be adjusted to the cylinder number of the internal combustion engine. The invention can be used for internal combustion engines of different types, such as for example diesel motors and gasoline motors.

The both transmitter disks 10, 13 are scanned by pickups 18, 19 formed for example as inductive pickups or Hall sensors. When they pass the angular marks, corresponding voltages in the pickups are supplied to a control device 20, these voltages are converted in a sensor or in a control device into a rectangular signals. The raising flanks of the rectangular signals correspond for example to the beginning of an angular mark, while the falling flanks of the rectangular signals correspond for example to the end of an angular mark. These signals or the time sequence of individual pulses are processed in the control device 20. The transmitter disks and the pickups are identified conventionally as a transmitter.

The control device 20 obtains input values which are required for control or regulation of the internal combustion engine, through various inputs. The input values are measured by corresponding sensors 21, 22, 23. For example, the sensor 21 can be a temperature sensor which measures the temperature of the motor.

The starting signal is supplied through the input 24 to the control signal, which is supplied during closing from the starter of the terminal KL.15 of the ignition lock 25.

The control device 20 is located at the outlet side and includes at least one microprocessor 30 and associated storage means. The signals for the injection are available for not shown components of the internal combustion engine, for example a diesel motor. These signals are transmitted through the outputs 26 and 27 of the control device 20. The voltage supply for the control supply 20 is provided in a conventional manner by a battery 28. The battery is connected through a switch 29 with the control device 20 during the operation of the internal combustion engine.

In the device shown in FIG. 1, the position of the crankshaft 11 and the camshaft 15 is every time determined during the operation of the internal combustion engine. Since the coordination between crankshaft 11 and the camshaft 15 is also known, as the coordination between the angular position between the camshaft 15 and the position of the individual cylinder, therefore after the recognition of the reference mark, a synchronization is performed and after the performed synchronization in a known manner the regulation of the internal combustion engine or the regulation of the injection is performed.

Figures 2A, 2B, 2C, 2D:
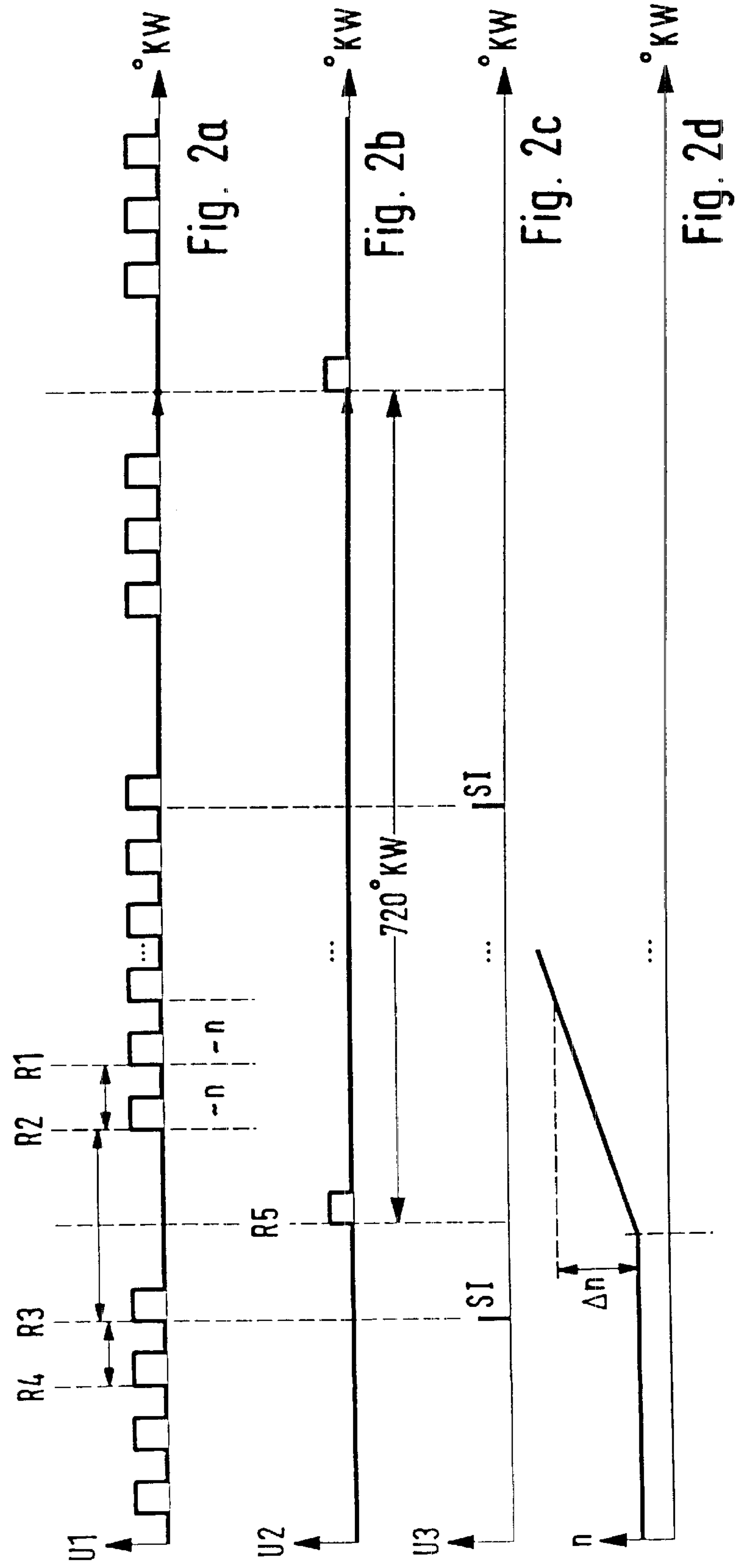
FIG. 2 shows various signals courses over a crankshaft angle.

For recognition or determination of the angular position of the crankshaft 11 and the camshaft 15, in the single course shown in FIGS. 2*a* and 2*b* the voltages U1, U2 are evaluated over the crankshaft angle °KW3. The reference mark 13 of the crankshaft disk 10 is detected when the microprocessor 30 of the control device 20 at least recognized that the distance between the successive return flanks R2 and R3 is significantly different from the distance of other return flanks R1 and R2 or R3 and R4 of the signal in accordance with FIG. 2*a*. At the time point of occurrence of the return flank R3, a synchronization pulse SI (voltage U3) is formed, which represents the position of the reference mark 13 of the crankshaft disk 10.

With a fully operational system with crankshaft transmitter and camshaft transmitter, additionally a pulse produced by the camshaft transmitter (pickup 19) is obtained, as shown in FIG. 2*b*. Since the camshaft per a working cycle rotates only once, this pulse or the return flank R5 of this pulse is suitable to perform a correct synchronization. With this pulse it is also possible to determine in what revolution the crankshaft is directly located.

In accordance with the present invention, it must be possible to perform a synchronization from a multi-meaning crankshaft transmitter signal shown in FIG. 3*a*, either in the event of a defect of the camshaft transmitter when the signal shown in FIG. 2*b* does not occur, or in a single embodiment of the internal combustion engine which operates without a camshaft transmitter. For this purpose the microprocessor 30 of the control device 20 evaluates time intervals between predetermined pulses of the crankshaft transmitter signal, for example between the return flanks R1 and R2, and from such time intervals which are inversely proportional to the rotary speed, determines the rotary speed of the crankshaft. For determination of the rotary speed, suitable signal flanks can be utilized, wherein in the region of the gaps (reference marks) special evaluation is required.

Figure 3:
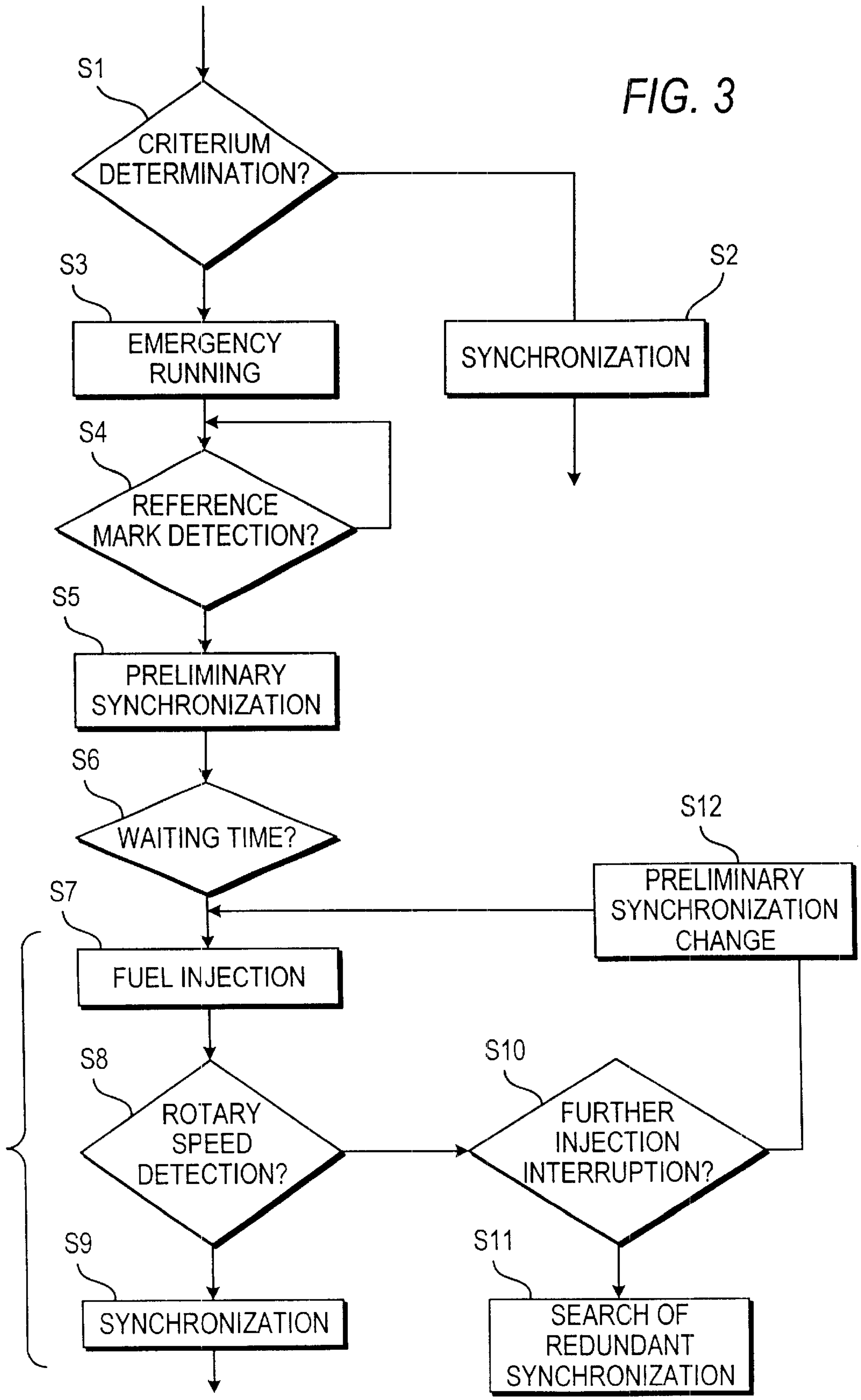
FIG. 3 is a view showing a flow chart which illustrates substantial steps of the inventive method.

From this conventionally running rotary speed detection and the crankshaft transmitter signal, the method shown in FIG. 3 is synchronized. For this purpose in the step S1 a predeterminable criterium is determined, whether the camshaft transmitter is defective or not. In the step S1 it is determined that a plausable signal from the pickup 19 is supplied to the control device 20, and in the step S2 the conventional synchronization is performed with the use of the camshaft and the crankshaft transmitter signal.

If however in the step S1 it is determined that the camshaft transmitter is defective or the signal supplied by the pickup 19 is not plausable, emergency running is provided in the step S3. In the step S4 is determined whether the reference mark of the crankshaft disk is detected, which in FIG. 1 is the gap 13. For this detection, in the control device 20 for example the rear flanks of the crankshaft signals of FIG. 2*a* are compared with one another, and the gap is detected and for example the distance between the signal flanks R2 and R3 is significantly greater than the distance between R1 and R2 and/or R3 and R4. If in the step S4 a gap is detected, then in the step S5 a preliminary synchronization is performed and for example the pulse S1 is in FIG. 2*c* is outputted.

After the preliminary synchronization in the step S5, an applicable or predeterminable waiting time is waited as shown in the step S6. After elapsing of this applicable waiting time, then starting from the preliminary synchronization the injection identified in the step S7 starts at the upper dead point or is offset by 360° KW relative to the upper dead point. For this injection the control device selects the cylinder which due to the structural properties must be determined in the upper dead point. If the injection leads to an ignition of the fuel, it must lead to an increase of the rotary speed or to a rotary speed acceleration, which can be determined in the control device 20 by the evaluation of the rotary speed. If in the step S8 this rotary speed is detected, the preliminary synchronization is converted into the final synchronization. In the step S9 the synchronization is performed, and the internal combustion engine is finally regulated in a conventional manner.

If to the contrary, in the step S8 no rotary speed increase is detected, the injection is performed in a false cylinder. The preliminary synchronization is changed then by 360° KW (step S12) and it is again attempted to provide an injection in an upper dead point of a cylinder. The steps S7 and S8 are repeated until the synchronization is found and the rotary speed increase is registered. Due to this provision it is guaranteed that a synchronization is possible also when an injection at a correct angle does not lead to an ignition. If a predeterminable number of the injections is reached after a preliminary synchronization then in the step S10 each further injection is interrupted, in the step S11 then the search of the redundant synchronization with the crankshaft signal is interrupted.

In order to provide that the injections occur not always in the same cylinder, the method disclosed in FIG. 3 can be completed in that the displacements of the injections are performed by other angles than 360°. The displacements are selected so that the selected cylinder is located near its upper dead point. The performance of the injections with different cylinder numbers and with redundant synchronization attempts is thereby applicable and must be designed so that in each cylinder fuel is injected in the course of synchronization attempts. Possible sequences in the four-stroke cylinder can be for example a first cylinder, a fourth cylinder, a third cylinder, a second cylinder. During the evaluation the control device can take into consideration basically further stored informations, for example with regard to the ignition tendency of different cylinders.

The inventive method is in principle suitable for self-igniting internal combustion engines and externally-ignited internal combustion engine. In the externally-ignited internal combustion engines, in addition to the injections, also the adapted ignitions must be evaluated.

It will be understood that each of the elements described above, or two or more together, may also find a useful application in other types of methods differing from the types described above.

While the invention has been illustrated and described as embodied in method of synchronization of multi-cylinder internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method of synchronization or of cylinder coordination to a crankshaft position for determining a cylinder position relative to a crankshaft angle in a multi-cylinder internal combustion engine with a crankshaft which rotates twice per working cycle, comprising the steps of supplying an output signal by a crankshaft transmitter, which per revolution of the crankshaft supplies a reference signal associated with an upper dead point of a piston of a predetermined cylinder;

evaluating the output signal of the crankshaft transmitter by a control device for determining a rotary speed of the crankshaft and for forming fuel injection signals;

performing a preliminary synchronization after a detection of the reference signal by releasing a test injection for an associated cylinder;

if a rotary speed increase is detected after the test injection, verifying the preliminary synchronization and performing a complete synchronization;

if an expected rotary speed increase failed, not providing the complete synchronization but instead releasing a new fuel injection for the same cylinder which is displaced by 360°;

if thereafter the rotary speed increase is detected, performing a verification of the preliminary synchronization;

if the rotary speed increase is not detected, releasing further fuel injections each correspondingly displaced by 360° until a rotary speed increase is recognized or a predeterminable maximum number of fuel injections is reached.

2. A method as defined in claim 1; and further comprising the step of releasing a fuel injection correspondingly after an elapsing of applicable waiting time after the first preliminary synchronization and/or at least one further synchronization.

3. A method as defined in claim 1; and further comprising the step of limiting a number of repetitions of the fuel injections to a predetermined maximum value.

4. A method as defined in claim 1; and further comprising the step of selecting the fuel injections so that in different cylinders a fuel injection is performed.

5. A method as defined in claim 1; and further comprising the step of selecting the fuel injections so that in each cylinder in a course of synchronization an attempt of a fuel injection is performed.

6. A method as defined in claim 1; and further comprising the step of selecting the fuel injections so that in different cylinders a fuel injection is performed and in each cylinder in a course of a synchronization attempt a fuel injection is performed.

* * * * *